(12) United States Patent
Urquhart et al.

(10) Patent No.: US 7,858,015 B2
(45) Date of Patent: Dec. 28, 2010

(54) BEVERAGE CONTAINER INSULATORS AND METHODS FOR MAKING THE SAME

(75) Inventors: Edward F. Urquhart, 1632 92$^{nd}$ Ave. NE., Clyde Hill, WA (US) 98004-2511; David A. Pierce, 20118 SE. 138$^{th}$ St., Renton, WA (US) 98059-7830

(73) Assignees: Edward F. Urquhart, Clyde Hill, WA (US); David A. Pierce, Renton, WA (US)

( * ) Notice: Subject to any disclaimer, the term of this patent is extended or adjusted under 35 U.S.C. 154(b) by 0 days.

(21) Appl. No.: 12/156,126

(22) Filed: May 28, 2008

(65) Prior Publication Data

US 2008/0315451 A1 Dec. 25, 2008

Related U.S. Application Data

(63) Continuation-in-part of application No. 11/641,621, filed on Dec. 18, 2006, now abandoned, which is a continuation of application No. PCT/US2005/021410, filed on Jun. 16, 2005.

(60) Provisional application No. 60/656,737, filed on Feb. 24, 2005, provisional application No. 60/601,039, filed on Aug. 12, 2004, provisional application No. 60/580,626, filed on Jun. 16, 2004.

(51) Int. Cl.
*B29C 41/16* (2006.01)
*B29C 41/50* (2006.01)
*D21J 3/00* (2006.01)

(52) U.S. Cl. .................. 264/301; 264/330; 264/302; 264/DIG. 66; 264/87; 162/218; 162/224; 162/226; 162/228; 206/485.1; 53/49; 53/50; 53/186

(58) Field of Classification Search .............. 264/330, 264/301, 302; 162/218, 224, 226, 228; 53/49, 53/50, 186
See application file for complete search history.

(56) References Cited

U.S. PATENT DOCUMENTS 1,590,956 A * 6/1926 Roy ........................... 162/221

(Continued)

FOREIGN PATENT DOCUMENTS

JP 2000219279 A 8/2000

(Continued)

OTHER PUBLICATIONS

International Search Report as attached to International Publication No. WO 2006/007416 A1, International Application No. PCT/US2005/021410, dated Oct. 14, 2005.

*Primary Examiner*—Philip C Tucker
*Assistant Examiner*—Alison Hindenlang (57) ABSTRACT

Methods for making a molded beverage container insulator from a slurry including water and a polysaccharide by presenting at least one male mold, which may have an elliptical cross section, therein and causing a portion of the slurry to temporarily adhere to the at least one mold. After a suitable period of time, removing the mold from the slurry and then removing the insulator. At such time, and particularly if the mold is not characterized as elliptical in cross section, the insulator is subject to bidirectional compression in order to collapse the same. Opposing hinge elements may be formed in the insulator, either at the time of molding or subsequently, to localize stresses resulting from the collapsing of the insulator. The resulting insulator is fully recyclable/compostable and possesses a constricting bias to mitigate container slip issues.

22 Claims, 5 Drawing Sheets

U.S. PATENT DOCUMENTS

| | | |
|---|---|---|
| 4,548,349 A | 10/1985 | Tunberg |
| 4,683,028 A * | 7/1987 | Waller et al. ................. 162/275 |
| 5,205,473 A | 4/1993 | Coffin, Sr. |
| 5,222,656 A | 6/1993 | Carlson |
| 5,425,497 A | 6/1995 | Sorensen |
| 5,445,315 A | 8/1995 | Shelby |
| 5,454,484 A | 10/1995 | Chelossi |
| D383,947 S | 9/1997 | Schaefer |
| 5,667,135 A | 9/1997 | Schaefer |
| 5,746,372 A | 5/1998 | Spence |
| 5,842,633 A | 12/1998 | Nurse |
| 5,857,615 A | 1/1999 | Rose |
| 6,053,352 A | 4/2000 | Cai |
| 6,273,333 B1 | 8/2001 | Ward |
| 6,286,754 B1 | 9/2001 | Stier et al. |
| 6,287,428 B1 * | 9/2001 | Gale et al. ................. 162/382 |
| 6,364,151 B1 | 4/2002 | Gale |
| 6,814,253 B2 | 11/2004 | Wong |
| 2003/0080120 A1 | 5/2003 | Whitmore et al. |
| 2003/0111475 A1 | 6/2003 | Cheng |
| 2004/0084460 A1 | 5/2004 | Scheetz, II et al. |
| 2005/0115975 A1 | 6/2005 | Smith et al. |

FOREIGN PATENT DOCUMENTS

| | | |
|---|---|---|
| JP | 2003137261 A | 5/2003 |

\* cited by examiner

BEVERAGE CONTAINER INSULATORS AND METHODS FOR MAKING THE SAME

CROSS-REFERENCE TO RELATED APPLICATION

Benefit of co-pending U.S. patent application Ser. No. 11/641,621 under 35 USC §120, which claimed benefit of then co-pending International Patent Application number PCT/US2005/021410 under 35 USC §120, which claimed priority to then co-pending U.S. Provisional Patent Application No. 60/656,737, filed on 24 Feb. 2005, U.S. Provisional Application No. 60/601,039, filed on 12 Aug. 2004, and U.S. Provisional Application No. 60/580,626, filed on 16 Jun. 2004 under 35 USC §119(e) is being claimed.

BACKGROUND

In the field of disposable hot or cold beverage containers, such as paper coffee cups, a common consumer complaint relates to the undesired transfer of heat from the container to a user's hand. Common solutions to this complaint have involved the use of a second container to surround the beverage holding container, corrugated or embossed sleeves encircling the beverage container such as found in U.S. Pat. Nos. 5,205,473 and 5,425,497, and expanded (mesh) material sleeves encircling the beverage container such as manufactured by Pactiv Corporation.

With respect to the use of a second container, it is well known that beverage vendor costs are increased by the use of a second container and that more raw materials are used for a single beverage serving. With respect to the use of corrugated or embossed sleeves, such sleeves reduce the use of raw materials by about 45% when compared to the use of a second container, however, they are not as efficient at insulation as desirable, do not employ the least costly materials, slip from cup too easily, have glue joint failures, etc. Generally expanded material sleeves do not use wood cellulose but, instead, use expanded styrene or polyethylene. Thus, there is a need for an alternative to corrugated or embossed sleeves that provide enhanced economies and similar recyclability of these products, but at a lower price point.

SUMMARY OF THE INVENTION

The invention is broadly directed to beverage container insulators that are intended to provide a means for conveniently isolating or mitigating the thermal condition of a fluid container from a user holding the container, as well as related methods for making the same. The various embodiments of the invention provide a variety of means and benefits combinations for insulating a user's hand from the beverage container.

As a preliminary matter, the terms "area", "boundary", "part", "portion", "surface", or "zone" (and similar descriptive terms), and their synonyms and plural forms, as may be used herein, are intended to provide descriptive references or landmarks with respect to the object being described. These terms are not intended, nor should be inferred, to delimit or define per se elements of the referenced object, unless specifically stated as such or facially clear from the several drawings and the context in which the term(s) is/are used. The terminal ends of numeric lead lines in the several drawings, when associated with any such term(s), are intended to representatively identify such references or landmarks with respect to the object being described. They are not intended, nor should be inferred, to delimit or define per se boundaries of the referenced object, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

In a first series of embodiments according to the invention, a variety of insulators are constructed from molded pulp. As used herein, molded pulp comprises any rigid or semi-rigid structure formed from slurries of a polysaccharide or similar polymer into a final structure, and functional equivalents thereof, and may include adjuncts thereto. A second series of embodiments is directed to multiple layer insulators. Certain embodiments rely upon selectively displacing the insulator from the container to achieve container insulation while others rely primarily upon material selection and thickness to provide the insulating characteristics. Methods for producing the insulators include cellulose pulp vacuum forming and sheet stock stamping, which will be described in greater detail below.

In the first series of embodiments, the insulator comprises a molded hollow cylinder. The cylinder includes an inside surface, an outside surface, a first end having a first opening, a second end having a second opening, and a body portion between the two ends. Each opening is defined by a perimeter that joins the inside surface to the outside surface, and the first opening preferably has a diameter greater than that of the second opening, thereby defining a generally frusto conical shape for use with containers that are not generally characterized as right cylinders.

As noted above, select versions in the first series of embodiments will have the first opening diameter greater than the second opening diameter. When taken in conjunction with the length of the body portion, one can determine the draft angle of the insulator. In a first subset of select embodiments thereof, the draft angle of the insulator is approximately equal to that of conventional hot beverage containers frequently used for serving coffee or tea, or to that of a specific conventional hot beverage container. In these select embodiments, material selection provides a primary means for insulation. A preferred material for constructing these select embodiments is cellulose or wood pulp. The resulting insulator therefore has a greater sectional thickness when compared to, for example, calendared paper cups, and also has a lower density that further aids in establishing an insulative layer between the beverage container and a user's hand. In addition, non-modified pulp-based products conventionally have a somewhat smooth side (the side exposed to the screen), and a rougher side characterized as having a plurality of protrusions and recesses). By establishing the rougher side as the inside surface, increased insulation properties can be achieved, as will be appreciated by those persons skilled in the art.

These versions of the first subset of select embodiments can be formed as ready-to-use (that is a generally frustoconical cylinder), or as collapsed or "flattened" cylinders. The collapsed insulator embodiments are characterized by a generally elliptical cross section taken along the insulator's longitudinal axis when it is not subject to any extrinsic mechanical forces (e.g., mechanical compression or mechanical tension), wherein an axis ratio of the major axis $A_{maj}$ to the minor axis $A_{min}$ ($A_{maj}/A_{min}$) is between a range of about 2.583 and 2.679, with the range preferably between about 2.5 and 2.7 (hereinafter the "axis ratio"). Such embodiments will hereinafter be referred to as "ellipsoid insulators" or "ellipsoid insulator embodiments". For purposes of this patent, such a configuration, when the ellipsoid insulator according to the invention is not subject to such extrinsic forces, is referred to as a relaxed or open position. Depending upon the embodiment, ellipsoid insulator embodiments may be further subject to a collapsing bias, thereby causing the axis ratio to approach very large numeric values, e.g., 100.

In either embodiment (frustoconical or ellipsoid), insulator embodiments may further comprise at least two, preferably opposed, longitudinally extending hinge elements. These hinge elements may comprise scored, perforated and/or sectionally enhanced portions of the insulator preferably, but not necessarily, extending from the first opening perimeter to the opposing second opening perimeter. One intended function of such hinge elements is to localize stress forces occurring in the insulator during manipulation, as will be further described. This preferred stress localization not only is intended to preserve the structural integrity of the other portions of the insulator, but is also intended to prevent the unintended creation of additional areas of localized material flexion that may result in additional locations of hinge-like actions. Depending upon the embodiments, the hinge elements may comprise an area or zone wherein additional material has been established, or may comprise an area or zone wherein material has been removed.

A feature of certain ellipsoid insulator embodiments is their ability to bias towards their relaxed state when manipulated into a geometric configuration other than a relaxed position, such as towards an axis ratio of 1/1. Because the formed polysaccharide material comprising any insulator according to the invention includes a certain level of material elasticity, an increase in the minor axis diameter of the ellipsoid insulator (and corresponding decrease in the major axis diameter axis due to preferred stress localization at the hinge elements, if present) will be elastically resisted. This selective radial modification must be maintained lest the ellipsoid insulator return to its relaxed position. If a beverage container is inserted into a so modified insulator and the manipulation terminated, then the insulator will bias towards the relaxed position, thereby "grasping" the inserted beverage container. As a consequence, the insulator generally will not move relative to the container when not being gripped by a user—a significant advantage over the prior art. Moreover, in embodiments wherein the first end opening diameter of the insulator is greater than the diameter of the beverage container in contact therewith, a gap between the container and the hinge portions will necessarily exist since the insulator is not in a state wherein the axis ratio is 1/1. This gap beneficially permits convective cooling of the beverage container if its temperature is greater than ambient.

While the geometric and mechanical features referenced above alternatively or in combination comprise insulator embodiments of the type discussed according to the invention, methods of manufacture related thereto comprise steps that in the alternative or in combination decrease production costs and facilitate transport of the resulting insulators, as well as prepare the external surface of such embodiments for applied indicia and/or designs. In addition to the methods described above with respect to non-ellipsoid embodiments of the invention, ellipsoid insulator embodiments are amenable to selective post creation radial collapse, preferably in the minor axis direction where the hinge elements are aligned in the major axis direction. In many embodiments, ellipsoid insulators are formed to maximize production efficiency, and to also create a desired relaxed state product. However, further minor axis radial collapse is both possible and desirable.

Once a just-formed insulator is removed from its mold and dried (initial conditions are generally 1-10% polysaccharide in a water slurry, 0.5-10 second vacuum molding, and subsequent drying by heat for a resulting moisture content of about 1-20% for an insulator having a sectional thickness of about 0.10-0.02), it is subject to a collapsing process, preferably carried out by opposing drums intended to "calendar" the product. The drums are preferably heated but need not be. This process not only temporarily collapses the insulator, but also further smoothes the outer surface to facilitate reception of ink should indicia or designs be intended for the outer surface. At about this same time, and preferably after, excess material can easily be removed from the flattened insulator such as by die cutting, laser cutting, water jet cutting or the like. Additionally, any desired curvature of the first and/or second ends can be imparted, e.g., the first end can have a radius of curvature equal to about 461.5 mm (18.17 in.) and the second end can have a radius of curvature equal to about 396.4 mm (15.61 in.). Bulk packaging of the resulting ellipsoid insulator embodiments ensures that there is a compressive bias on the insulators. However, once this bias has been removed, the previously described resiliency of the insulators will result in a partial recovery of the elliptical shape of the initially molded insulator.

Those persons skilled in the art will appreciate that there are numerous means available for forming and optionally collapsing ellipsoid insulator embodiments of the invention, and that the disclosure herein is meant only to serve as an example to enable a person of ordinary skill in the art to reproduce the described embodiment. While scores or other forms of stress localizers forming hinge elements are preferred, they are not necessary. Moreover, it is possible to create a "flattened" insulator from a right cylinder or frustoconical cylinder. However, there are advantages as well as disadvantages to each approach, which approaches do not depart from the scope of the invention.

A feature of some invention embodiments is the presence of an enhanced lip portion at the first opening perimeter. The lip portion is characterized as band of increased diameter material with a lower annular segment extending radially inwardly (either orthogonally or preferably obliquely) to the body. The inclusion of this feature beneficially increases the radial crush resistance of the insulator and provides a convenient means for intercepting "dribbles" that might otherwise reach the user's hand or drip from the bottom of the container.

While the first subset of the first series of embodiments may be simple, they represent a significant savings in per unit manufacturing costs when compared to sleeves and insulators of the prior art. Particularly with respect to embodiments formed from cellulose pulp, these select versions increase the coefficient of friction between the insulator and the container. While conventional sleeves such as those constructed from corrugated stock use a smooth and somewhat calendared inner surface, molded embodiments preferably use cellulose pulp. This production method and material selection exploits the course surface of the finished product to increase the coefficient of friction between it and the container. Moreover, this composition permits the use of 100% recycled cellulose pulp with no degradation in performance. An ancillary benefit is a significant reduction in final product cost as well as the previously mentioned reduction in heat transfer rates. Moreover, frusto-conical embodiments may be nested for storage, transportation (collapsed embodiments regardless of ultimate geometric form also have desirable storage and shipment form factors) and dispensing, thereby reducing post manufacturing costs.

However, it is recognized that as beverage containers vary in dimensions, so do respective draft angles. In this respect, a second subset of select first series embodiments incorporates expansion means for permitting a limited number of insulators to adapt to nearly all conventional, single-serving beverage containers. These expansion means conjunctively or disjunctively comprise the creation of a plurality of slits extending from one of an area proximate to one end or the body portion to one of the other end or an area adjacent but prior to the other end perimeter, or the creation of a plurality of radially displaceable stand-off elements. The slits and/or stand-off elements may be congruent with the axis of the insulator or may be skew thereto in orientation, and may be rectilinear or curvilinear in shape.

With respect to the slit embodiments of the first series, by extending the plurality of slits to the second end (putatively the bottom of the insulator), a plurality of narrow "V" or partially unbounded slits/slots are formed when urged radially outwardly. This collet configuration beneficially permits acceptance of container diameters greater than the diameter of the second opening perimeter. Thus, the insulator can have a draft angle greater than that of the container, yet not be limited to containers having a similar or greater draft angle. Because insertion of a container into such an insulator will cause conforming radial displacement of the second opening perimeter only sufficient to accept the container, the insulator provides a range of viable draft angles for a plurality of distinct draft angle containers.

A feature of these embodiments provides for terminating a slit just prior to the second perimeter (thereby creating a frangible slit). By applying a radially outward force to the second perimeter (such as during insertion of a container having a diameter greater than that of the second perimeter), it is possible to breach the perimeter at the slit location, thereby creating an open or wide "V" slit extending from the area proximate to the first end or body portion past the second end. When a plurality of slits are present, this insulator configuration beneficially conforms to those containers wherein the draft angle is less than that of the insulator, or where the container diameter is greater than that of the second end: As a bottom portion of a container is inserted into the insulator from the first end thereof to the second end, the bottom portion of the container will progressively apply a radially outward force to the inside wall of the insulator until the expansive force causes the second end perimeter to breach. The incorporation of a frangible slit enhances the handling of the insulators since the second end perimeter is not susceptible to unintentional displacement that may occur during nesting or other handling actions.

Still other embodiments of the first series of embodiments permit a user to frictionally retain a container therein without contact between the first opening perimeter and the container. This is accomplished by providing a sleeve with a draft angle greater than that of the container for which the sleeve is used. In such embodiments, the second opening perimeter and a portion of the body adjacent to the second opening perimeter contact the container while the first opening perimeter and a portion of the body adjacent to the first opening perimeter do not. In such an arrangement, thermal conduction by the insulator at the non-contacting portions is eliminated.

With respect to the radially displaceable stand-off elements embodiments, by biasing the placement of these features towards one end of the body, a plurality of unique draft angle containers can be accepted. In these embodiments, radial expansion occurs not as a result of material separation as is the case with slit-bearing embodiments, but through material displacement. In select embodiments of this type, the stand-off elements comprise pleats extending from one end of the insulator towards the other, and preferably well into the body portion. When taking into account an objective to retain a frusto-conical geometry, the pleats preferably taper from the small diameter opening (putatively the second opening) to the opposite opening. The described pleats can be formed during formation of the insulator or induced post formation through the use of heat and pressure during a "crimping" process, which will be described in greater detail below.

While a preferred implementation of the stand-off elements are pleats, equally applicable are radially inwardly projecting protrusions (of any geometric form) formed on the inner surface of the body portion used in conjunction with either pleats or functionally equivalent structures, or with slits/slots. If used with the latter, an additional benefit is realized: the dead air gap between the beverage container and the insulator further increases the resistance to heat transfer from the container to the user's hand.

The referenced pleats can have a generally planar faces, thereby forming angle intersections, or can have generally smooth faces, thereby forming a trough-like cross sectional profile. Research into both forms has shown that smooth faces provide for a more uniform radial expansion and reduce the propensity of pulp build-up at planar intersections, which further reduces uniform material displacement upon presentation of radially outward forces. However, by integrating a slit at select locations of pulp build-up and/or establishing a score at select locations, the deflection properties of these areas can be advantageously modified for desired insulator operability.

As noted above, the slit features and the stand-off features may be combined into one embodiment. In such embodiments, the slits serve to localize radial expansion forces, thereby preserving desirable geometric attributes of the stand-off elements. Alternatively, scoring or "coining" of selected portions of the stand-off elements can achieve similar force localization effects without having to use slits.

In a derivative of the first series of embodiments, a molded insulator is provided that is manipulated after manufacture to create an insulating sleeve. Unlike "ready-to-use" insulators heretofore described, the derivative insulators are projections (two dimensional or semi-two dimensional mappings of the entire surface of the three dimensional insulator) of the corresponding insulator. For convenience, these derivatives will be referred as clam-shell embodiments. Thus, for conventional hot beverage containers having a discernable draft angle, the insulator comprises a first edge, a second edge spaced apart from the first edge, wherein both edges are preferably arcuate and equidistant from each other. Two spaced apart lateral edges each join the first and second edges such that the four edges define a body portion. Because the contemplated materials used for construction of the second series of embodiments are somewhat rigid, a plurality of bending zones or hinge segments may be imparted into the insulator during manufacture or subsequent manipulation. In addition to these hinge segments, which may have areas of increased thickness or scoring to facilitate bending, contoured relief portions (generally arcuate sections of the ultimately formed cylinder comprising the insulator) may be formed there between. Thus, when the insulator is manipulated into a frusto conical cylinder in order to receive a beverage container, the body portion already has a plurality of hinged contoured relief portions that permit a close fit therewith.

A benefit to constructing an insulator according to this derivative of the first series of embodiments relates to speed of manufacture, particularly when the insulator is constructed from cellulose pulp. As those persons skilled in the art will appreciate, the deeper a form is, the slower the manufacturing process will be. Because insulators, according to the this series of embodiments, have a minimal depth (the depth of the mold is directly related to the "height" of the contour relief portions and generally will not exceed 38 mm or 1.5 inches as compared to the previously described first series of embodiments wherein the depth may be as great as 80 mm or 3.5 inches), manufacturing output is greatly increased. While the "cost" for such efficiency is that the user or beverage provider must then manipulate the insulator to fit the container, this post manufacturing step is not undertaken by the manufacturer. Moreover, the generally compact nature of such insulators greatly increases the packaging ability thereof.

Because these first series derivative embodiments are not manufactured in a "ready-to-use" state, means must be provided for securing the first lateral edge or body portion proximate thereto to the second lateral edge or body portion proximate thereto. Two preferred means are mechanical fastening and chemical bonding, e.g., adhesive. With respect to mechanical fastening, in one set of embodiments at least one tab and slot configuration can be used where a tab is formed at the first edge (alternatively, the tab can be established in the body portion proximate to the first edge by cutting the outline of a tab therein and subsequently dislodging the tab therefrom, as will be described in more detail below) and a slot is formed in the body portion proximate to the second edge by cutting a slot therein. In another set of embodiments, at least one slit can be created at each lateral edge, such that the opposing slits engage one another during assembly of the insulator. Examples in the prior art of achieving such connectivity, which are incorporated herein by reference, include those found in U.S. Pat. Nos. 5,857,615; 5,842,633; 5,425,497 and in United States application publication number US 2003/0111475.

With respect to chemical bonding, an adhesive can be applied to one or both body portions proximate to one or both lateral edges such that, when the edges are overlapped, one body portion will contact the formerly opposing body portion. Those persons skilled in the art will appreciate the diversity of alternative chemical securing techniques available to accomplish the desired objective.

In an alternative to the derivative embodiments of the first series, the general form of the beverage container is ascertained and an insulator mold is created based upon this form (leaving, of course, at least the corresponding beverage container opening unobstructed so that a user may freely remove liquid from the container when surrounded by the insulator). However, the mold is carried out in a clamshell fashion so that for each insulator there are two halves, preferably hingedly linked to one another. Preferably, the form of the beverage container upon which the mold is based is divided along the sagittal or coronal plane (as opposed to the horizontal/transverse plane). By constructing the mold in this fashion, the depth of the mold can be minimized, which significantly increases production speed, as is well known in the art.

A second series embodiment is broadly characterized as an insulating ring constructed from a flexible material such as paste board, plastic(s), inflatable poly bladders or foam(s), and preferably from molded paper pulp or partially pleated paper. The insulating ring comprises a cylindrical skirt having a first end and a second end, and a flange located at one end wherein the flange defines a variable diameter, expandable orifice.

The flange is characterized as comprising a circumferential portion having an outer circumference generally equal to that of the skirt and preferably an upper end of the skirt. The circumferential portion may be annular or coextensive with the outer circumference. Extending radially inward from the circumferential portion is a plurality of arms. Each arm is flexibly linked to the circumferential portion and separate from adjacent arms by one of a slit, a slot or a span. Thus, each arm can flex in relationship to the flange independently of one another. As used herein, a slit should be interpreted as meaning a nominal distance between adjacent arms such as resulting from a blade or rule cut; a slot should be interpreted as meaning a minimal distance between adjacent arms such as resulting from the removal of a strip of material; a span should be interpreted as meaning a distance between adjacent arms such as resulting from the removal of a piece of material having an area from 5% to 30% of an arm.

In use, the end of the skirt nearest the flange is considered the upper portion of the skirt. A user desiring to enjoy an insulated grip of the beverage container inserts the bottom portion of the beverage container through the expandable orifice at the upper portion of the skirt. In response to this insertion, the arms radially displace and diameter of the expandable orifice adapts to receive the bottom portion of the beverage container. The arms continue to move in response to the container insertion until the interaction between the outer surface of the container and the arms sufficiently resists further container translation so that a user ceases further insertion. Preferably, the flexible linkage between the arms and the circumferential portion has a desirable level of deflection resistance such as the further the container translates in the skirt, the greater the friction between the container outer surface and the arms.

Because many of the second series embodiments will utilize a single material for construction, the degree of deflection resistance can be varied by modulating the arc length of each arm (the arc length need not, but can, be the same for all arms); modulating the radial depth of the slit, slot or span between arms; or the geometry of the slit, slot or span between arms, e.g., pure radial, swept radial, etc. changes to frictionally receive the peripheral surface of the container. Additional methods for construction and compositions can be employed. For example, the radial length of one or more arms can be varied; the diameter and geometry of the orifice can be varied; surface treatments can be integrated on the surface or body of one or more arms to increase the coefficient of friction thereof; and as illustrated the pitch of the arms can be varied to create a "stand off" when arms are engaged and depressed into the center of the cylinder (sleeve).

Additionally, the skirt can comprise at least one stand-off element at the end opposite the flange. A stand-off element is a structure that effectively decreases the diameter of the skirt at the end opposite the flange and creates, when a beverage container is inserted into the skirt, a set off distance between the container outer surface and the inner surface of the skirt. The stand-off element can be a continuous annular element, a segmented annular element, a plurality of regularly or irregularly spaced point or linear protrusions, and the like. Alternatively, the skirt can comprise at least one stand-off element at any location on the inner surface of the skirt.

In addition to the foregoing, the skirt can be of a right cylinder design or a frusto-conical design. If the later, the skirt is particularly suited for use with beverage containers having a complementary geometry, which includes having draft angles of approximately 4° to 6°.

A benefit of the second series embodiment is its slip resistance relative to the beverage container. Because the distal edges of the arms act against the outer surface of the beverage container much like barbs, and because of the considerable surface area of contact between the arms and the container, unintentional slipping of the ring relative to the container is minimized. Arm lateral edge contact can be used to increase slip resistance by employing swept radial arms that permit the side edges of the arms to contact the beverage container when the arms are flexed during container insertion.

DETAILED DESCRIPTION OF THE EMBODIMENTS

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

Figure 1:
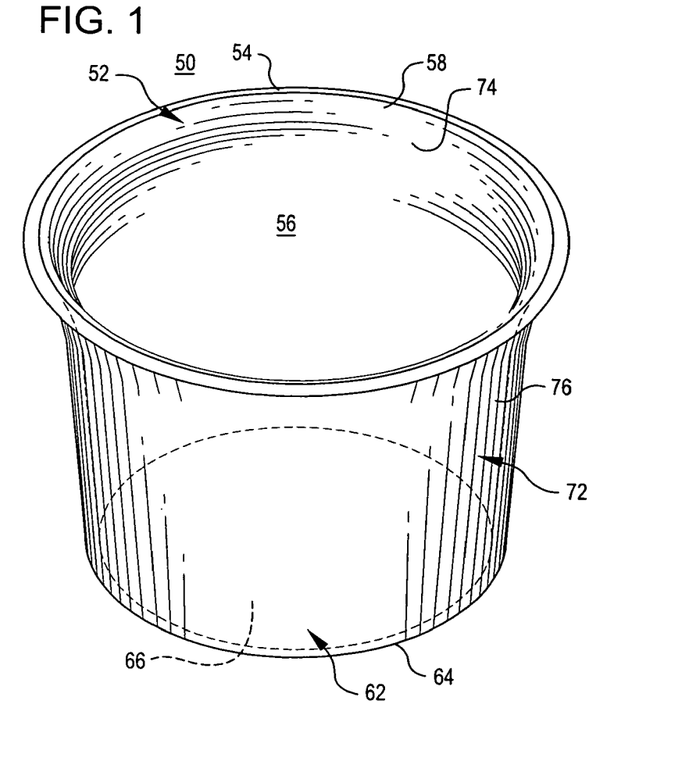
FIG. 1 is a perspective view of a first series of embodiments illustrating a simple molded insulator for surrounding a disposable beverage container having a draft angle.
Figure 2:
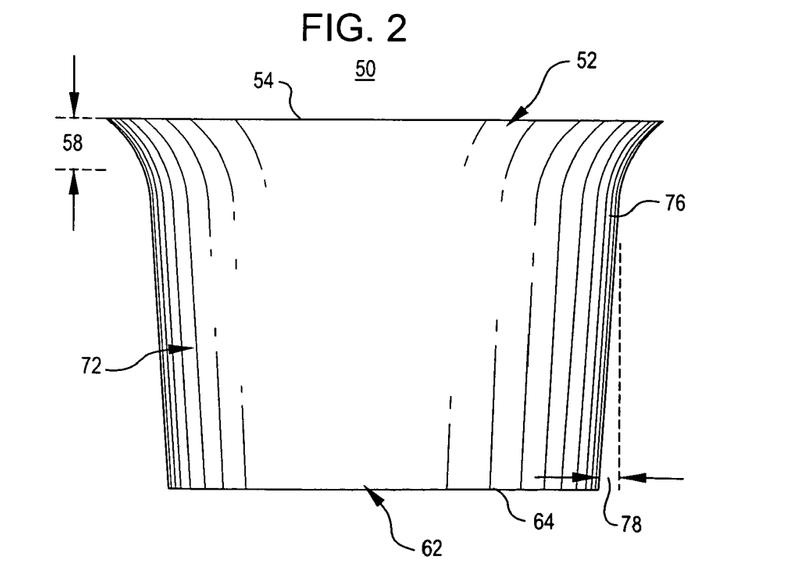
FIG. 2 is an elevation view of the embodiment of FIG. 1.

Turning then to the several Figures wherein like numerals indicate like parts, and more particularly to FIGS. 1 and 2, a simplified first series embodiment is shown. The insulator of the invention includes cylinder 50, which has an upper end 52 and a lower end 62 separated by body portion 72. Upper end 52 includes upper perimeter 54, which defines opening 56, and may optionally include lip 58. Lower end 62 includes perimeter 64, which defines opening 66. Body portion 72 includes inside surface 74 and outside surface 76. The draft of cylinder 50 is shown at 78. The embodiment shown in these FIGS. 1 and 2 is preferably formed from a wood pulp slurry through vacuum forming, as is well known in the art as applied to other applications.

Figures 3, 4, 5, 6:
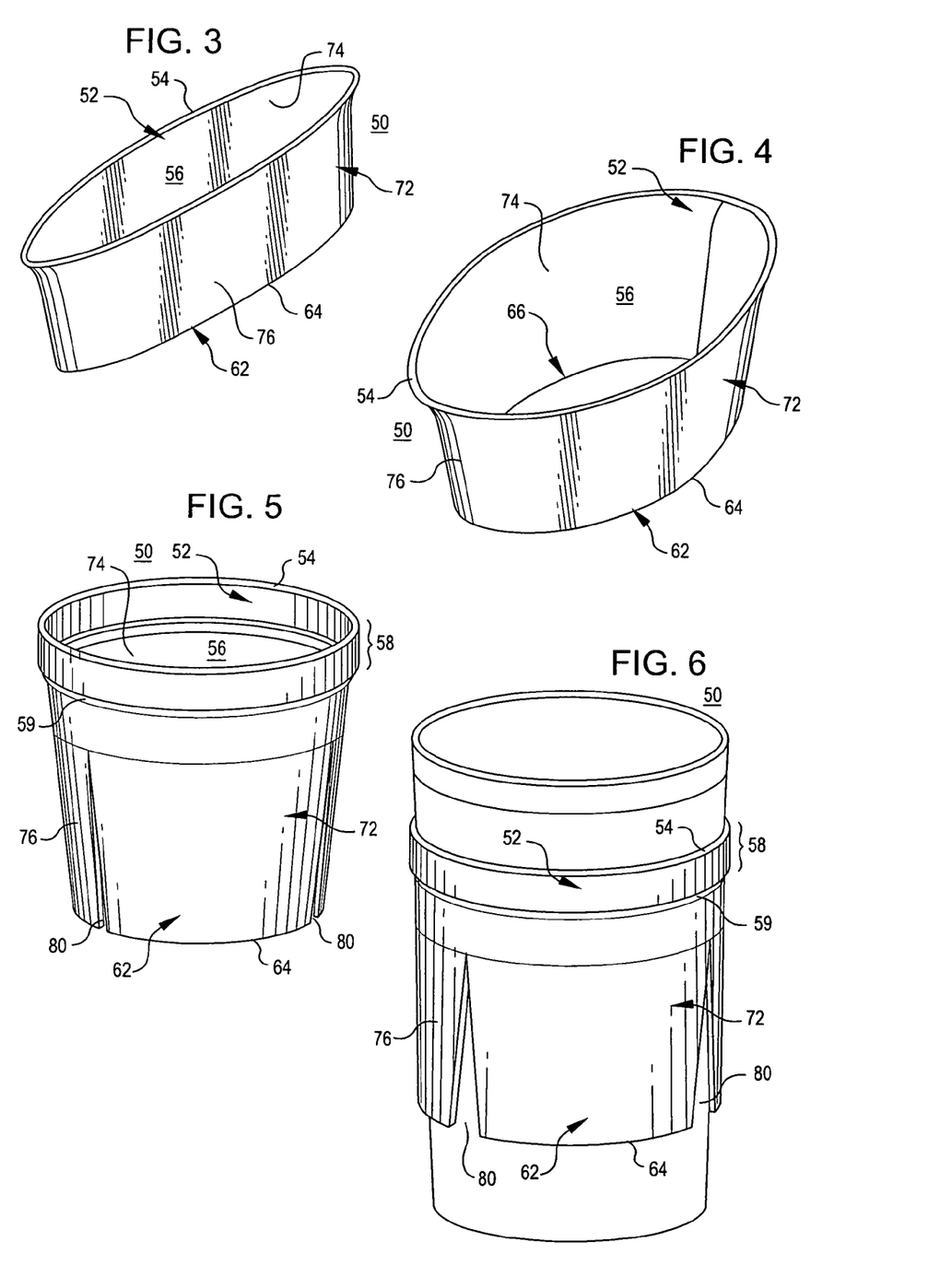
FIG. 3 is a perspective view of a truncated version of the embodiment of FIG. 1 wherein the unitary insulator has been collapsed to facilitate efficient packing for shipping.
FIG. 4 is a perspective view of the embodiment of FIG. 3 wherein the insulator has been partially expanded to receive a container.
FIG. 5 is perspective view of a slit embodiment of the first series of embodiments wherein a plurality of slits/slots extend from a perimeter of the insulator to a body portion thereof, and further illustrating the incorporation of an expanded lip.
FIG. 6 is a perspective view of the embodiment of FIG. 5, shown surrounding a beverage container after radial expansion of the perimeter.

FIGS. 3 and 4 illustrate the embodiment of FIGS. 1 and 2 in a collapsed mode to increase packing density. With the exception of not including lip 58 and decreasing the length of body portion 72, this embodiment is the same as that of FIGS. 1 and 2.

FIG. 5 shows a slit embodiment of cylinder 50 wherein a plurality of slits 80 are formed in body portion 72 and extend there from to lower perimeter 64. In these embodiments, lower perimeter 64 is free to radially expand outward upon being biased, such as when inserted over a disposable beverage container such as shown in FIG. 6. Because of this feature, the draft angle of the cylinder may be greater than that of the beverage container, however, the draft angle of cylinder 50 is variable in this regard and lower perimeter 64 will radially expand to accommodate containers having a draft angle less than that of cylinder 50. As a result of this separation, slit 80 transform into a pronounced "V" shape as best shown in FIG. 6.

Figure 7:
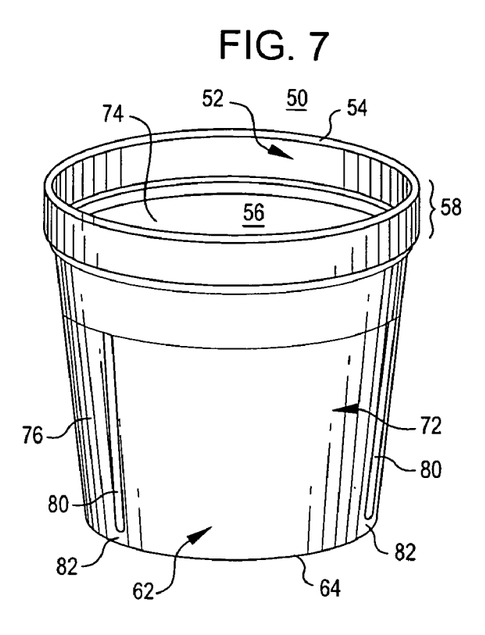
FIG. 7 is a derivative embodiment of that shown in FIG. 5, but wherein a frangible slit is formed at the perimeter.

An alternative arrangement to that shown in FIGS. 5 and 6 is shown in FIG. 7 wherein lower perimeter 64 is retained. In this embodiment, frangible portion 82 is formed and will breach upon application of a sufficient radially outward bias at lower perimeter 64. In both slit embodiments, radial expansion is characterized as material separation.

Figure 8:
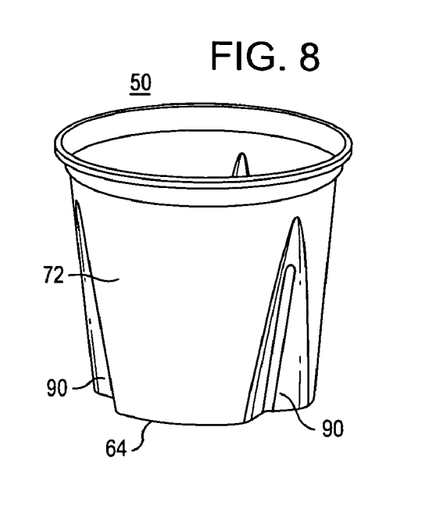
FIG. 8 is a perspective view of a pleated embodiment of the first series of embodiments.
Figure 9:
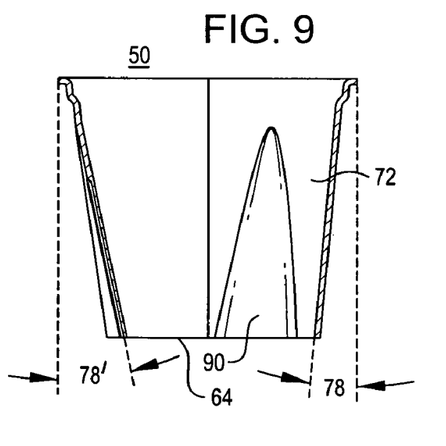
FIG. 9 is a cross sectional elevation view of the embodiment shown in FIG. 8 detailing the dimensions and geometry of the pleated embodiment.
Figure 10:
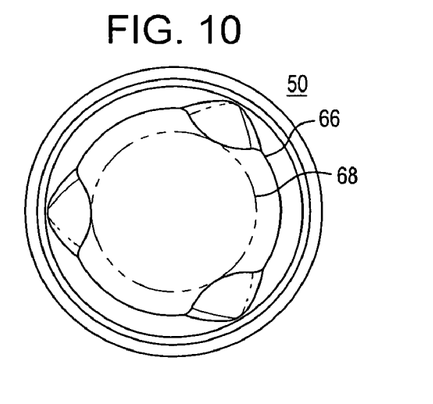
FIG. 10 is a plan view of the embodiment of FIG. 8, particularly illustrating the reduced diameter opening at the lower perimeter due to the radially inward extension of the pleats.

Turning then to cylinder 50 in FIGS. 8-10, a pleated embodiment is shown. In this embodiment, portions of body portion 72 and lower perimeter 64 are displaceable. Pleats 90 are shown as being smooth-walled, although alternative embodiments now shown herein employ planar faces. As noted in FIG. 9, slits or scorings are provided at pleats 90 to facilitate force localization, thereby insuring that radial expansion does not otherwise affect the generally circular cross section geometry of cylinder 50. Also shown in FIG. 9 is maximum draft angle 78' and nominal draft angle 78. Thus, the illustrated embodiment can accommodate disposable containers having draft angles at least within this range, which is believed to accommodate nearly all commercially available disposable beverage container.

FIG. 10 particularly shows both nominal opening diameter 66 and reduced diameter 68. As long as the target beverage container has a minimum diameter of at least that of reduced diameter 68, it can be accommodated by the illustrated embodiment.

Figure 11:
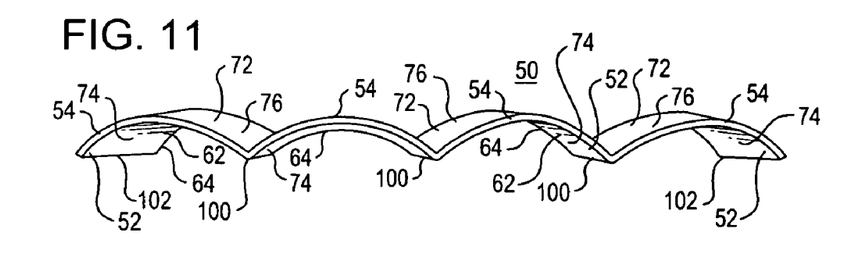
FIG. 11 is an end view of a clam-shell embodiment of the first series of embodiments particularly illustrating the nature and location of hinge portions and contour relief portions to facilitate formation of a frusto-conical cylinder.
Figure 12:
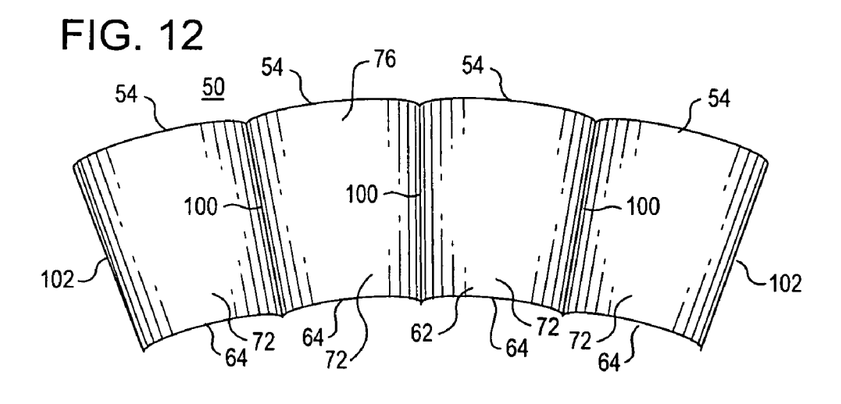
FIG. 12 is a plan view of the claim-shell embodiment of FIG. 12.
Figure 13:
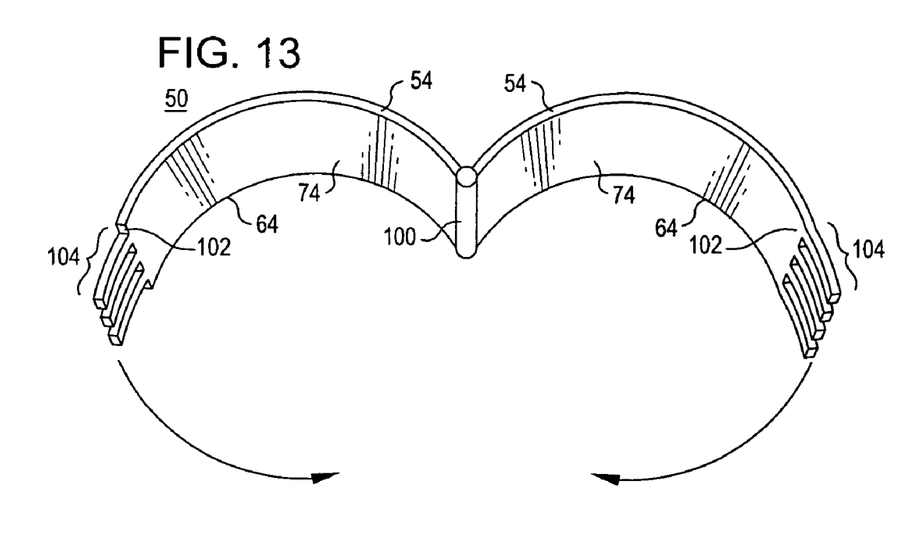
FIG. 13 is a perspective view of an alternative clam-shell embodiment having two semi-cylindrical sections linked by a hinge element and using an interleaving means for securing one end thereof to the other
Figure 14:
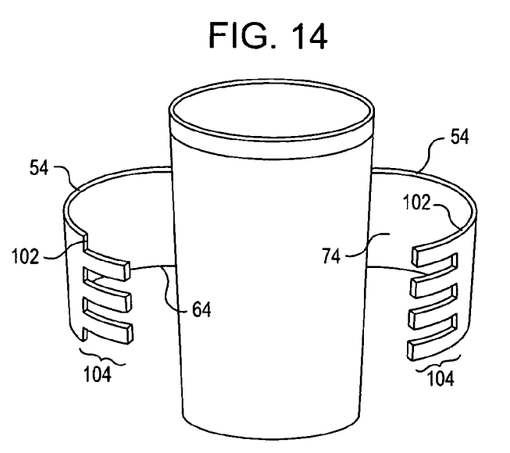
FIG. 14 is a perspective view of the embodiment of FIG. 14 prior to encircling a beverage container.
Figure 15:
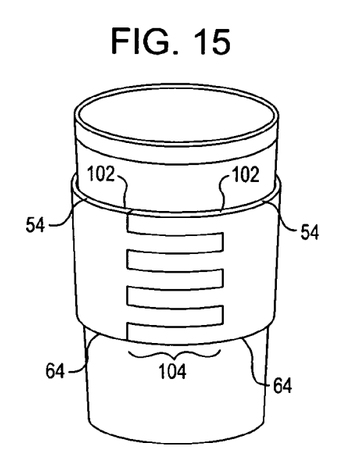
FIG. 15 is a perspective view of the embodiment of FIG. 15 after encirclement of the container and interleaving of its closure elements.

The embodiment of FIGS. 3 and 4 is shown in a "clam-shell" configuration in FIGS. 11 and 12. This embodiment includes hinge elements 100, which serve to link the quarter cylinders comprising cylinder 50 when ends 102 are joined. Each quarter cylinder is considered a "contour relief" in an otherwise two dimensional projection of cylinder 50 of FIGS. 3 and 4. FIGS. 13-15 illustrate an alternative embodiment to that of FIGS. 11 and 12 wherein interlocking elements 104 are employed to secure ends 102 to each other, thereby forming cylinder 50 upon encirclement of a disposable beverage container.

Figures 16, 17:
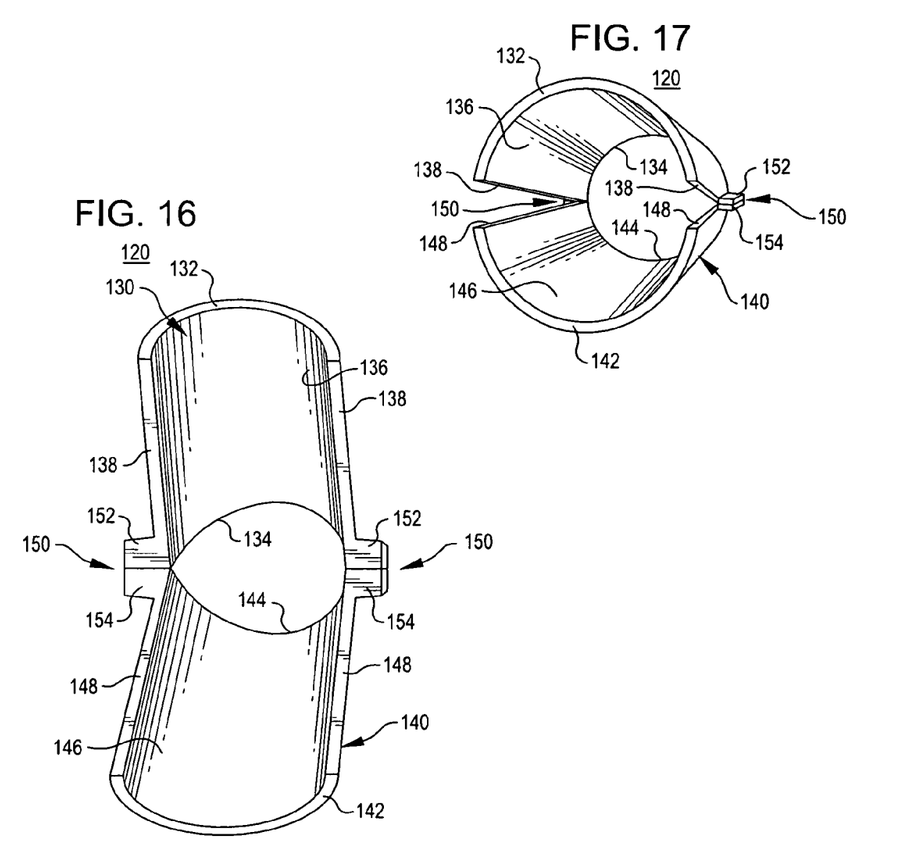
FIG. 16 is a plan view, in perspective, of an additional alternative clam-shell embodiment shown in a substantially open position.
FIG. 17 is an elevation view, in perspective, of the embodiment of FIG. 17 shown in a substantially closed position.

FIGS. 16 and 17 illustrate an alternative clam-shell embodiment. Here, cylinder 50 is characterized as clamshell sleeve 120. Sleeve 120 includes first shell 130 and second shell 140. First shell 130 includes major rim portion 132 and minor rim portion 134 as well as body portion 136 and edges 138; second shell 140 includes major rim portion 142 and minor rim portion 144 as well as body portion 146 and edges 148.

First shell 130 and second shell 140 are pivotally linked to each other by a pair of hinge elements 150. Each hinge element includes a first portion 152 and a second portion 154. First portion 152 of each hinge element 150 is connected to or integrally extends from edges 138 proximate to minor rim portion 134 while second portion 154 of each hinge element 150 is connected to or integrally extends from edges 148 proximate to minor rim portion 138. As those persons skilled in the art will appreciate, the precise location of hinge elements 150 may be varied and still retain much of the functionality of the second embodiment: the hinge elements may link adjacent minor rim portions 138 and 148; the hinge elements may be located at minor rim portions 138 and 148.

A benefit to establishing an axis of pivot proximate to but not at minor rim portions 138 and 148 is the creation of tail segments 160 as is best shown in FIG. 7. When tail segments 160 are present, a fulcrum arrangement is created. Upon insertion of a beverage container, the lower portion of such container contacts tail segments 160, which cause the remaining portions of sleeve 120 beyond the axis of pivot as defined by hinge elements 150 to adduct. In this manner, as long as there is contact between tail segments 160 and the wall of the beverage container, there is an adduction bias to sleeve 120. This bias assists in preventing the unintentional abduction of sleeve 120 about the beverage container. To assist in this bias, it is preferable to include at least one stand-off element (not shown) to the interior surface of each tail segment 160.

What is claimed:

1. A method for making a beverage container insulator having an inside surface, an outside surface, a first end at a first opening, a second end at a second opening and a body portion between the first and second ends, wherein each opening is defined by a perimeter that joins the inside and outside surfaces, the method comprising:
    creating a slurry comprising water and a polysaccharide;
    presenting at least one male mold having a generally frusto conical geometry to the slurry and causing a portion of the slurry to temporarily adhere to the at least one mold;
    removing the mold from the slurry and then removing the insulator; and
    collapsing the insulator such that in cross section it forms an ellipsoid having a major axis to minor axis ratio greater than about 2.5 ($A_{maj}/A_{min}>2.5$) and less than about 2.7 ($A_{maj}/A_{min}<2.7$).

2. The method for making a beverage container insulator according to claim 1 further comprising forming first and second hinge elements in the insulator.

3. The method for making a beverage container insulator according to claim 2 wherein the hinge elements are in general opposition.

4. The method for making a beverage container insulator according to claim 2 wherein the hinge elements extend from the first end to the second end.

5. The method for making a beverage container insulator according to claim 2 wherein the forming of hinge elements occurs at the time of insulator molding.

6. The method for making a beverage container insulator according to claim 1 wherein collapsing of the insulator occurs prior to or contemporaneously with a subsequent heating step.

7. The method for making a beverage container insulator according to claim 1 further comprising trimming at least one of the first end or second end.

8. The method for making a beverage container insulator according to claim 1 further comprising imprinting the outside surface of the insulator.

9. The method for making a beverage container insulator according to claim 1 wherein the polysaccharide is derived from plant cellulose.

10. The method for making a beverage container insulator according to claim 1 wherein the slurry comprises from 1-10% polysaccharide.

11. The method for making a beverage container insulator according to claim 1 further comprising forming first and second hinge elements in the insulator at the time of insulator molding wherein the hinge elements are in general opposition and extend from the first end to the second end of the insulator.

12. A method for making a beverage container insulator having an inside surface, an outside surface, a first end at a first opening, a second end at a second opening and a body portion between the first and second ends, wherein each opening is defined by a perimeter that joins the inside and outside surfaces, the method comprising:
    creating a slurry comprising water and a polysaccharide;
    presenting at least one male mold having an elliptical cross section wherein a major axis to minor axis ratio is greater than about 2.5 ($A_{maj}/A_{min}>2.5$) and less than about 2.7 ($A_{maj}/A_{min}<2.7$), and causing a portion of the slurry to temporarily adhere to the at least one mold; and
    removing the mold from the slurry and then removing the insulator,
    collapsing the insulator such that in cross section it forms an ellipsoid having a major axis to minor axis ratio greater than about 2.7 ($A_{maj}/A_{min}>2.7$) and less than 100 ($A_{maj}/A_{min}<100$).

13. The method for making a beverage container insulator according to claim 12 further comprising forming first and second hinge elements in the insulator.

14. The method for making a beverage container insulator according to claim 13 wherein the hinge elements are in general opposition.

15. The method for making a beverage container insulator according to claim 13 wherein the hinge elements extend from the first end to the second end.

16. The method for making a beverage container insulator according to claim 13 wherein the forming of hinge elements occurs at the time of insulator molding.

17. The method for making a beverage container insulator according to claim 12 further comprising collapsing the insulator such that in cross section a major axis to minor axis ratio is greater than that of the mold.

18. The method for making a beverage container insulator according to claim 17 wherein the collapsing of the insulator occurs prior to or contemporaneously with a subsequent heating step.

19. The method for making a beverage container insulator according to claim 12 further comprising trimming at least one of the first end or second end.

20. The method for making a beverage container insulator according to claim 12 further comprising imprinting the outside surface of the insulator.

21. The method for making a beverage container insulator according to claim 12 wherein the polysaccharide is derived from plant cellulose.

22. The method for making a beverage container insulator according to claim 12 wherein the slurry comprises from 1-10% polysaccharide.

* * * * *